United States Patent [19]

Rilly

[11] Patent Number: 4,780,652
[45] Date of Patent: Oct. 25, 1988

[54] CIRCUIT FOR CONTROLLING A BRUSHLESS ELECTRIC MOTOR

[75] Inventor: Gerard Rilly, Unterkirnach, Fed. Rep. of Germany

[73] Assignee: Deutsche Thomson-Brandt GmbH, Villingen-Schwenningen, Fed. Rep. of Germany

[21] Appl. No.: 940,761

[22] PCT Filed: Feb. 15, 1986

[86] PCT No.: PCT/EP86/00077
§ 371 Date: Nov. 4, 1986
§ 102(e) Date: Nov. 4, 1986

[87] PCT Pub. No.: WO86/05336
PCT Pub. Date: Sep. 12, 1986

[30] Foreign Application Priority Data

Mar. 6, 1985 [DE] Fed. Rep. of Germany ....... 3507883

[51] Int. Cl.$^4$ ............................................. H02P 6/00
[52] U.S. Cl. .................................. 318/254; 318/345 H
[58] Field of Search ................... 318/138, 254, 345 D, 318/345 H, 439

[56] References Cited

U.S. PATENT DOCUMENTS

| | | | |
|---|---|---|---|
| 3,333,171 | 7/1967 | Platnick | 318/138 |
| 3,466,519 | 9/1969 | Platnick | 318/138 |
| 3,529,220 | 9/1970 | Kazutsugu Kobayashi et al. | 318/254 |
| 3,959,709 | 5/1976 | Irish | 363/149 X |
| 4,238,719 | 12/1980 | Bourbeau | 318/716 |
| 4,431,958 | 2/1984 | Schutten et al. | 318/816 |

FOREIGN PATENT DOCUMENTS

| | | | |
|---|---|---|---|
| 56-121377 | 9/1981 | Japan | 318/345 D |
| 60-176473 | 9/1985 | Japan | 318/345 H |

Primary Examiner—Bentsu Ro
Attorney, Agent, or Firm—Max Fogiel

[57] ABSTRACT

A control circuit for controlling a brushless motor for a washing machine comprises AC main voltage, a phase-trimming circuit for trimming the AC main voltage and supplying the trimmed AC main voltage to the stator windings of the brushless motor, depending on a control voltage derived from a rotor position sensor of the brushless motor. The phase-trimming circuit changes the polarity of the trimmed AC main voltage so that a first polarity is supplied to a first stator winding and a second polarity is supplied to a second stator winding of the brushless motor.

6 Claims, 3 Drawing Sheets

CIRCUIT FOR CONTROLLING A BRUSHLESS ELECTRIC MOTOR

BACKGROUND OF THE INVENTION

The invention concerns a circuit for controlling a brushless electric motor, especially a slow-running flat motor of the type appropriate for operating washing machines directly for example. In directly operating the drum of a washing machine the speed must be varied within extensive limits, specifically 40 to 70 rpm for the wash cycle and approximately 1000 rpm for the spin cycle. With synchronous motors this is completely impossible because the speed of a synchronous motor depends on the mains frequency, which is invariable.

SUMMARY OF THE INVENTION

The object of the invention is create a circuit for controlling a brushless electric motor that will allow the motor to run slowly independent of the mains frequency. A further development of the invention also attains the object of maintaining a symmetrical load on the mains in spite of unsymmetrical feeding of the stator winding.

There are several advantages to operating a motor with the circuit in accordance with the invention. The potential for varying the speed of the motor within extensive limits makes it possible to employ the motor in a washing machine for directly driving the drum both during the slow wash cycle and during the rapid spin cycle. The potential for controlling the currents supplied to the stator windings and to the brushless rotor eliminates the need for collectors and accordingly increases reliability. Since the reversal of direction that is so important with washing machines can be accomplished strictly electronically by controlling the stator winding, no output relay is necessary. Electronic controls can also lead to electric braking. For this purpose a torque can be generated, by reversing the polarities of the incoming voltages for instance, that is directly opposite the existing direction of rotation. The phase-trimming control also makes it possible to vary the torque because varying the phase-trimming angle will affect the electric power being supplied to the motor and hence the torque.

The control circuit for controlling a plurality of stator windings is preferably employed. It is, however, also possible to restrict the employment to only one stator winding. This is in particular possible at a high speed, at which the frequency of the magnetic field and that of the mains are approximately equal. The motor can then run like a synchronous motor, in which the torque that is generated can be controlled by varying the phase-trimming angle. The mains voltage can be simply the voltage obtained from one line. It can, however, also by derived by means of a voltage converter (inverse rectifier) from a direct-current voltage, from a battery for example, when the motor output is low and allows input from a battery. The torque generated by the motor is generally not constant, but varies periodically through the motor's angle of rotation. This torque, however, will be adequately integrated by the inertia of the rotor and of the components it drives.

BRIEF DESCRIPTION OF THE DRAWING

The invention will now be specified with reference to the drawings, wherein.

DESCRIPTION OF THE PREFERRED EMBODIMENTS

Figure 1:
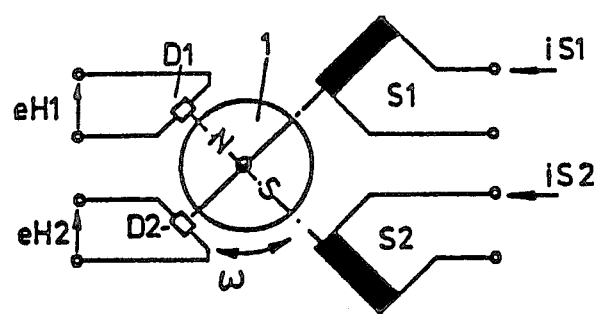
FIG. 1 illustrates the principle behind the controls in accordance with the invention.

FIG. 1 illustrates the rotor 1, two stator windings S1 and S2, and two Hall components D1 and D2 of a motor. Rotor 1 has, diametrically opposed, a north pole N and a south pole S created by permanent magnets. Hall components D1 and D2 generate voltages eH1 and eH2 that represent the instantaneous angle of rotation of rotor 1. Voltages eH1 and eH2 control the currents iS1 and iS2 supplied to windings S1 and S2 in such a way that the windings generate north and south poles alternatingly. These operate in conjunction with the poles of rotor 1 and make it rotate in the desired direction.

Figure 2:
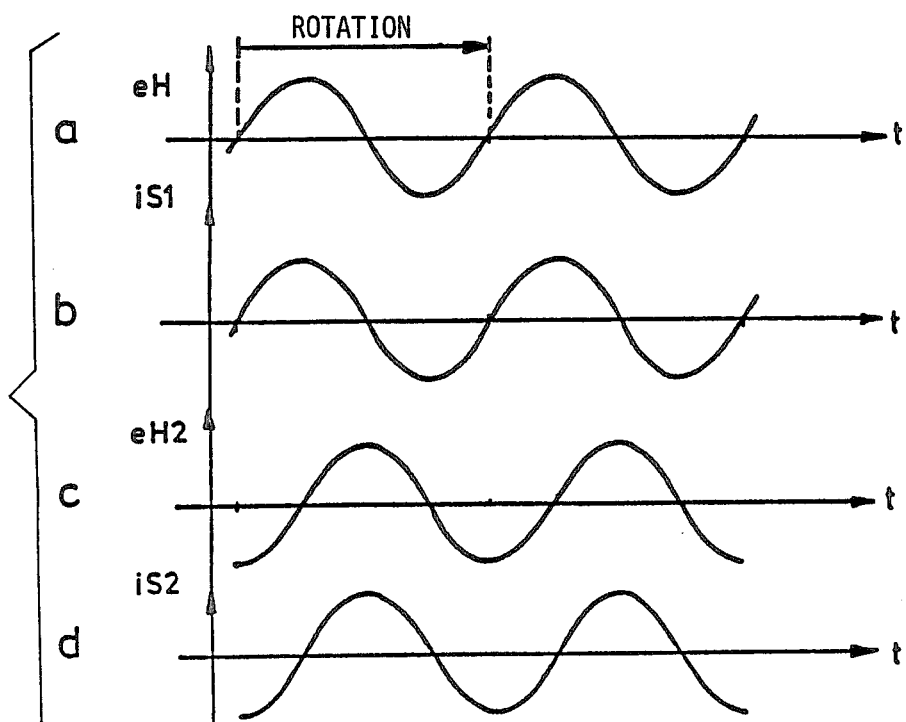
FIG. 2 shows curves that illustrate the operation of the embodiment illustrated in FIG. 1.

FIG. 2 illustrates the activity of the voltages and currents illustrated in FIG. 1. Currents iS1 and iS2 are mutually phase-shifted 90° depending on the position of windings S1 and S2. The north and south poles generated by windings S1 and S2 accordingly constitute the rotation field necessary to rotate rotor 1. When currents iS1 and iS2 are directly derived from mains frequency, the speed of the motor will be dictated by that frequency and can only be varied by changing the number of poles, the number of requisite stator windings in other words, in stages.

Figure 3:
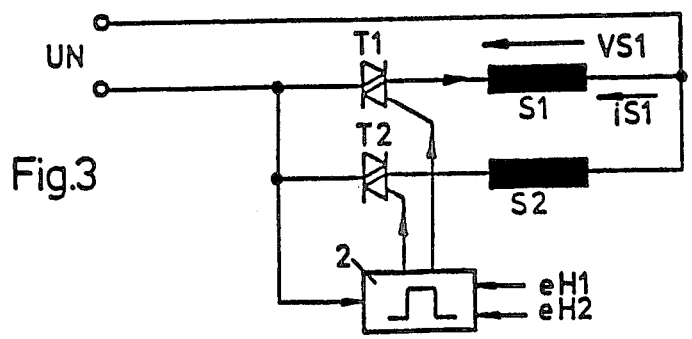
FIG. 3 illustrates a practical embodiment of the invention.

FIG. 3 illustrates a development in which the speed is not dictated by the frequency of the applied mains voltage UN. Mains voltage UN is applied to both windings S1 and S2 through two triacs T1 and T2. Triacs constitute switches that conduct an alternating current in both directions and that can be turned off and on as desired at a control electrode called a gate. Triacs T1 and T2 are controlled by, control circuit 2. Mains voltage UN on the one hand and both voltages eH1 and eH2 on the other are applied to control circuit 2 by Hall components D1 and D2.

Figure 4:
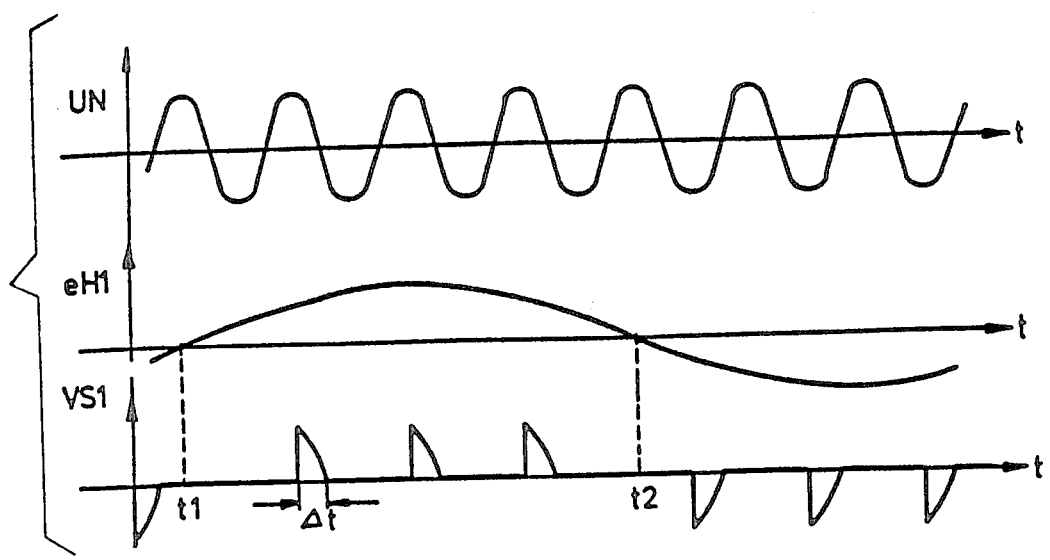
FIG. 4 shows curves that illustrate the operation of the embodiment illustrated in FIG. 3.

FIG. 4 demonstrates that the frequency of voltage eH1 is essentially lower than that of mains voltage UN. A voltage for controlling triac T1 is constructed from voltages eH1 and eH2 and makes them briefly conductive only during each time period Δt in the sense of varying the phase trimming. Each time priod Δt begins at the maximum of the positive half wave of mains voltage UN. Winding S1 accordingly receives voltage pulses VS1 of the same polarity, which generate essentially proportional current pulses iS1 in winding S1. These current pulses of constant polarity generate a north pole for example. This process extends from t1 to t2. It will be evident that the frequency of voltage eHl and hence the duration of t1 to t2 is not dictated by the mains frequency, but can be selected independently of the mains frequency. Time t1 to t2 can accordingly be as long as desired in relation to the mains period, so that a low speed that is independent of the mains frequency can be obtained.

Commencing at time t2, the negative half wave of voltage eH1 generates ignition pulses with another phase position, so that voltage pulses VS1 and hence corresponding current pulses iS1 will be generated from the negative half waves of mains voltage UN. This reverses the polarity of the magnetic pole generated by winding S1. Each group of voltage pulses and current pulses during a time t1 to t2 accordingly corresponds to a halve wave of the curve iS1 in FIG. 2.

As will be evident from FIG. 4, only the positive half waves of mains voltage UN are processed during a longer period of time, t1 to t2 in the figure. This signifies an unsymmetrical and anomalous load on the mains, which decreases the efficiency of the motor and can violate regulations and lead to malfunctions.

Figure 5:
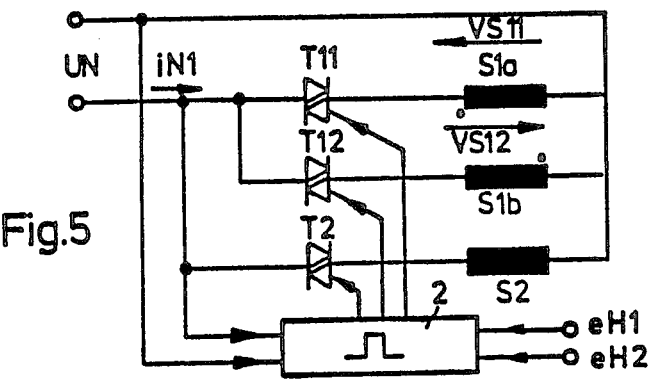
FIG. 5 illustrates a second embodiment of the invention.
Figure 6:
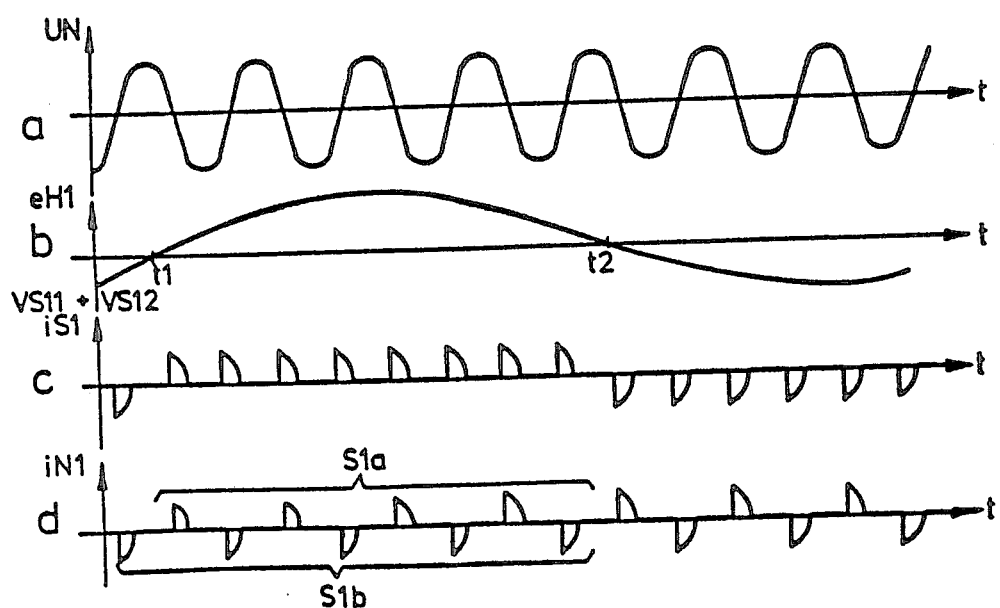
FIG. 6 shows curves that illustrate the operation of the embodiment illustrated in FIG. 5.

The development illustrated in FIG. 5 eliminates the drawback of unsymmetrical load on the mains. Current pulses iN1 are derived from the mains by appropriately controlling triacs T11 and T12 as illustrated in FIG. 6d. This means that the positive and negative half waves of mains voltage UN are uniformly processed, resulting in a symmetrical load on the mains. Winding S1 is separated into two subsidiary windings S1a and S1b, which are poled similar to each other and magnetically opposed as represented by the points. Triacs T11 and T12 are appropriately controlled to supply positive current pulses iN1 to subsidiary winding S1a and negative current pulses iN1 to subsidiary winding S1b. Since the windings are oppositely poles, the sum of voltages VS11 and VS 12, and hence current iS1, will result in the curve illustrated in FIG. 6c for the total winding S1=S1a+S1b. As in FIG. 4, winding S1, which consists of S1a and S1b, will be supplied with current pulses of the same polarity during each half duration of voltage eH1 in its effect on the magnetic field. Triac T11 is made conductive by the applied control voltag only during the positive current pulses in accordance with the current-flow angle of phase-trimming control and triac T12 only during negative current pulses iN1. Whereas, therefore, the mains is subjected as desired to a symmetrical load by current iN1, overall winding S1 will be supplied from t1 to t2 with unsymmetrical current pulses of constant polarity as illustrated in FIG. 6c, so that a specific magnetic pole, N or S, will be generated. During the time period subsequent to time t2, there will be a reversal of polarity as illustrated in FIG. 4, so that the negative current pulses iN1 will now arrive at winding S1a and the positive current pulses iN1 at subsidiary winding S1b, and the requisite reversal of polarity of the magnetic pole generated by winding S1 will occur at time t2. The same procedure can be followed with winding S2. It is, however, also possible to supply only one stator winding as specified herein.

I claim:

1. A circuit for controlling a slow-running brushless electric motor for washing machine, comprising:

a permanent magnet rotor and stator winding in said motor;

a rotor position sensor;

a main voltage supply for supplying AC main voltage;

a phase-trimming circuit for trimming said AC main voltage and supplying the trimmed AC main voltage to said stator winding by a control voltage derived from the rotor position sensor for controlling the supply of said trimmed AC main voltage to said stator winding;

said phase-trimming circuit changing the polarity of said trimmed AC main voltage supplied to said stator winding after a number of periods of said trimmed AC main voltage;

said stator winding having subdivided a first subsidiary winding and a second subsidiary winding being of opposite polarity, said trimmed AC main voltage of a first polarlity from said main voltage supply being appled to said first subsidiary winding, and said trimmed AC main voltage of a second polarity opposite to said first polarity being applied to said second subsidiary winding.

2. A circuit as defined in claim 1, wherein said two subsidiary windings are identical.

3. A circuit as defined in claim 1, wherein said phase-trimming circuit comprises at least a triac.

4. A circuit as defined in claim 3, wherein said at least a triac is connected in series with one of said subsidiary windings.

5. A circuit as defined in claim 3, wherein one triac is connected in series with each subsidiary winding.

6. A circuit as defined in claim 1, wherein said first and second subsidiary winding are of magnetically opposite polarity.

* * * * *